Patented Dec. 16, 1952

2,622,101

UNITED STATES PATENT OFFICE 2,622,101

PRODUCTION OF 1.1.3-TRIALKOXYALKANES

Raymond Paul, Versailles, and Serge Tchelitcheff, Vitry-sur-Seine, France, assignors to Societe des Usines Chimiques Rhone Poulenc, Paris, France No Drawing. Application October 30, 1950, Serial No. 193,028. In France November 4, 1949

7 Claims. (Cl. 260—615)

This invention relates to the production of organic compounds and particularly to the production of tri-alkoxy alkenes.

The said compounds conform to the general Formula I:

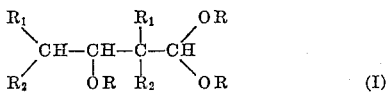

(I)

where the several R's are straight or branched chain alkyl radicals containing up to 6 carbon atoms, e. g. methyl, ethyl, propyl or butyl and $R_1$ and $R_2$ represent hydrogen atoms or any such alkyl radicals.

Some compounds of this series have already been produced. For example the compound 1:1:3-triethoxy butane has been prepared by condensing ethyl alcohol with crotonaldehyde (Newbury and Calkin, American Chemical Journal, 12, 524, and Meier, Berichte der Deutschen Chemischen Gesellschaft, 76, 1016) and the same compound has also been produced by the reaction of diethyl acetal $CH_3.CH(OC_2H_5)_2$ with ethyl vinyl ether $CH_2:CH.OC_2H_5$, the reaction being one of addition and molecular re-arrangement (U. S. Patent No. 2,165,962).

The present invention provides an entirely new method of producing 1:1:3-trialkoxy alkanes of the foregoing general Formula I. According to the invention, 1:1:3-trialkoxy alkanes are produced by bringing a dialkyl acetal of the general Formula II:

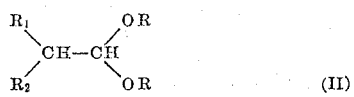

(II)

where R, $R_1$ or $R_2$ have the meanings assigned to them above, into contact with an electrophilic metallic salt capable of forming a compound with diethyl ether, and maintaining such contact for a period sufficient, under the physical conditions obtaining, to allow the formation of a substantial proportion of 1:1:3-trialkoxy alkane. The metallic salt may be employed as such or in the form of its etherate, e. g. with diethyl ether. Suitable such metallic salts are zinc chloride, ferric chloride, boron trifluoride, aluminum chloride, stannous chloride and stannic chloride.

The said metallic salts apparently act as catalysts promoting an internal condensation of the dialkyl acetal with itself, a reaction which proceeds, as will be apparent from a consideration of the formulae, by the elimination of a molecule of alcohol from each two molecules of dialkyl acetal and a molecular re-arrangement of the elements remaining.

The reaction takes place at room temperature but may be accelerated by heating. Conveniently the reaction may be brought about by heating the dialkyl acetal with the metallic salt under reflux at the boiling temperature of the acetal. Frequently some dialkyl acetal remains unchanged and this may be separated from the 1:1:3-trialkoxy alkane by any convenient method, e. g. by fractional distillation.

The dialkyl acetals employed as starting materials, as may be seen from the general Formula II may be the acetals formed from aliphatic aldehydes containing from 2 to 7 carbon atoms in a straight or branched chain and primary or secondary alcohols containing from 1 to 6 carbon atoms.

The following examples, in which the parts are by weight, will serve to illustrate the invention but are not to be regarded as limiting it in any way.

Example I 59 parts of diethyl acetal one 1 part of zinc chloride are heated for 7 hours under reflux. After cooling, the mixture is washed with 55 parts of a 10% potassium carbonate solution, dried over anhydrous potassium carbonate and distilled in vacuo. After separation of the fraction consisting of unconverted acetal, 1:1:3-triethoxy butane is obtained, the yield based on the acetal used up being good.

Example II 59 parts of diethyl acetal and 1 part of the diethyl ether compound of boron trifluoride are left in contact for 24 hours at room temperature, whereafter the mixture is washed, dried and distilled as in Example I. A yield of 96% 1:1:3-triethoxy butane is thus obtained.

Example III 47 parts of diethyl acetal and 1 part of ferric chloride are heated for 5 hours under reflux and then treated as in Example I.

Example IV 74 parts of di-isobutyl acetal and 2 parts of the diethyl ether compound of boron trifluoride are left in contact for 24 hours at room temperature and then washed, dried and distilled as in Example I. After separation of the fraction consisting of unconverted acetal, 1:1:3-tri-isobutoxy butane (B. P.$_{20\,mm.}$ 138–139° C.) is collected in a yield of 68% on the acetal used up.

Example V 73 g. of di-isopropyl acetal and 1.5 g. of powdered zinc chloride are heated for 24 hours at 100° C. After cooling, the mixture is poured into 100 cc. of a 10% solution of sodium carbonate, the water is decanted, the organic layer is dried over potassium cabonate, and the product is filtered and distilled. 1:1:3-tri-isopropyl-oxy-butane (B. P.$_{20\ mm.}$ 10° C. $d_4^{21}$ 0.867, $n_D^{21}$ 1.4142) is obtained in a good yield.

Example VI 115 g. of dihexyl acetal and 2 g. of molten powdered zinc chloride are heated for 20 hours at 125° C. The product of the reaction is washed with 100 cc. of 10% potassium carbonate ($K_2CO_3$) and dried over anhydrous $K_2CO_3$. On distillation, 1:1:3-trihexyl-oxy butane melting at 172°–174°C. under 2 mm. pressure, $d_4^{20}$ 0.867, $n_D^{20}$ 1.4385, is obtained in a good yield.

Example VII 59 parts of 1:1-dimethoxy butane (dimethyl acetal of butyl aldehyde) and 1 part of freshly melted and powdered zinc chloride are heated for 16 hours at 100° C. After cooling, the mixture is agitated with 50 cc. of a 10% aqueous solution of potassium carbonate, and the organic layer is dried over potassium carbonate and distilled. After separation of a fraction consisting of a certain quantity of dimethyl acetate of the unconverted butanal, 1:1:3-trimethoxy 2-ethyl hexane boiling at 102°–104° under a pressure of 20 mm. of mercury, $d_4^{22}$ 0.909, $n_D^{22}$ 1.4266, is obtained.

Example VIII 73 parts of 1:1-diethoxy butane and 1 part of zinc chloride are heated for 12 hours at 100° C. The mixture is then washed with 50 cc. of a 10% aqueous solution of sodium carbonate and then with 50 cc. of water, dried over potassium carbonate, filtered and distilled. 1:1:3-triethoxy 2-ethyl hexane, B. P.$_{20mm.}$ 125°–126°, $d_4^{20}$ 0.879, $n_D^{20}$ 1.4249 is thus obtained in a 74% yield taking into account the unconverted acetal recovered.

Example IX

After heating a mixture of 202 parts of 1:1-dibutoxy butane and 4 parts of zinc chloride for 17 hours at 125° C., the reaction mixture is poured on to 100 cc. of a 20% aqueous solution of potassium carbonate, and the organic layer is washed with 100 cc. of water, dried over potassium carbonate and then distilled. The 1:1:3-tributoxy 2-ethyl hexane thus obtained has the following constants: B. P.$_{2mm.}$ 139°–140°, $d_4^{22}$ 0.872, $n_D^{22}$ 1.4418.

Example X

On treating 87 parts of 1:1-di-isopropyloxy heptane 2 parts of zinc chloride as in Example VII, 1:1:3-tri-isopropyloxy 2-pentyl nonane, B. P. 185°–187° C., $d_4^{23}$ 0.864, $n_D^{23}$ 1.4386 is obtained.

Example XI

On heating 94 parts of 1:1-diethoxy heptane and 2 parts of zinc chloride for 6 hours at 100° C. and heating as in Example VII, 1:1:3-triethoxy 2-pentyl nonane (B. P.$_{1.5mm.}$ 137°–139° C. $d_4^{21}$ 0.867, $n_D^{21}$ 1.4359) is obtained.

Example XII

A mixture of 73 parts of 1:1-diethoxy butane and 5 parts of etherate of boron fluoride is allowed to settle for 40 hours, whereafter it is washed with 50 cc. of a 20% aqueous solution of potassium carbonate, and then dried over potassium carbonate. On distillation, the 1:1:3-triethoxy 2-ethyl hexane already described in Example VIII is obtained.

Example XIII

On treating 146 parts of 1:1-diethoxy 2-methyl propane and 3 parts of zinc chloride in the same manner as in Example VII, 2:2:4-trimethyl 1:1:3-triethoxy pentane, B. P.$_{20mm.}$ 114°–115° C., $d_4^{22}$ 0.8825, $n_D^{22}$ 1.4249, is obtained.

We claim:

1. Process for the production of 1:1:3-trialkoxy alkanes which comprises bringing a dialkyl acetal of the general formula:

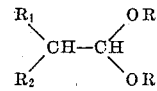

where R is an alkyl radical containing 1 to 6 carbon atoms and $R_1$ and $R_2$ are selected from the class consisting of the hydrogen atom and alkyl radicals containing 1 to 6 carbon atoms, into contact with an electrophilic metallic salt selected from the class consisting of zinc chloride, ferric chloride, boron trifluoride, aluminium chloride, stannous chloride and stannic chloride, and the combinations of these salts with diethyl ether, the said dialkyl acetal being the sole reactive compound present, maintaining such contact at a temperature at most equal to the boiling temperature of the said dialkyl acetal, and separating 1:1:3-trialkoxy alkane from the reaction mixture.

2. Process for the production of 1:1:3-trialkoxy alkanes which comprises bringing a dialkyl acetal of the general formula:

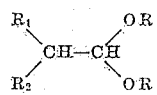

where R is an alkyl radical containing 1 to 6 carbon atoms and $R_1$ and $R_2$ are selected from the class consisting of the hydrogen atom and alkyl radicals containing 1 to 6 carbon atoms, into contact with the diethyl etherate of an electrophilic metallic salt selected from the class consisting of zinc chloride, ferric chloride, boron trifluoride, aluminium chloride, stannous chloride and stannic chloride the said dialkyl acetal being the sole reactive compound present, maintaining such contact at a temperature at most equal to the boiling temperature of the said dialkyl acetal, and separating 1:1:3-trialkoxy alkane from the reaction mixture.

3. Process for the production of 1:1:3-triethoxy butane which comprises bringing a dialkyl acetal of acetaldehyde in which the alkyl groups contain 1 to 6 carbon atoms into contact with an electrophilic metallic salt selected from the class consisting of zinc chloride, ferric chloride, boron trifluoride, aluminium chloride, stannous chloride and stannic chloride, and the combinations of these salts with diethyl ether, the said dialkyl acetal being the sole reactive compound present, maintaining such contact at a temperature at most equal to the boiling temperature of the said dialkyl acetal, and separating 1:1:3-alkoxy butane from the reaction mixture.

4. Process for the production of 1:1:3-triethoxy butane which comprises bringing a dialkyl acetal of acetaldehyde in which the alkyl groups contain 1 to 6 carbon atoms into contact with the diethyl etherate of a metallic salt selected from the class consisting of zinc chloride, ferric chloride, boron trifluoride, aluminum chloride, stannous chloride and stannic chloride, the said dialkyl acetal being the sole reactive compound present, maintaining such contact at a temperature at most equal to the boiling temperature of the said dialkyl acetal, and separating 1:1:3-alkoxy butane from the reaction mixture.

5. Process for the production of 1:1:3-trialkoxy alkanes which comprises refluxing a dialkyl acetal of the general formula:

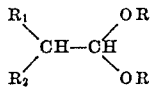

where R is an alkyl radical containing 1 to 6 carbon atoms and $R_1$ and $R_2$ are selected from the class consisting of the hydrogen atom and alkyl radicals containing 1 to 6 carbon atoms, with metallic salt selected from the class consisting of zinc chloride, ferric chloride, boron trifluoride, aluminium chloride, stannous chloride and stannic chloride, and the combinations of these salts with diethyl ether, the said dialkyl acetal being the sole reactive compound present, and separating 1:1:3-trialkoxy alkane from the reaction mixture.

6. Process for the production of 1:1:3-trialkoxy alkanes which comprises refluxing a dialkyl acetal of the general formula:

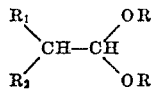

where R is an alkyl radical containing 1 to 6 carbon atoms and $R_1$ and $R_2$ are selected from the class consisting of the hydrogen atom and alkyl radicals containing 1 to 6 carbon atoms, with the diethyl etherate of an electrophilic metallic salt selected from the class consisting of zinc chloride, ferric chloride, boron trifluoride, aluminium chloride, stannous chloride, and stannic chloride, the said dialkyl acetal being the sole reactive compound present, and separating 1:1:3-trialkoxy alkane from the reaction mixture.

7. Process for the production of 1:1:3-triethoxy butane which comprises heating acetaldehyde diethyl acetal under reflux with an electrophilic metallic salt selected from the class consisting of zinc chloride, ferric chloride, boron trifluoride, aluminium chloride, stannous chloride and stannic chloride, and the combination of these salts with diethyl ether, the said diethyl acetal being the sole reactive compound present, and separating 1:1:3-trialkoxy-butane from the reaction mixture.

RAYMOND PAUL.
SERGE TCHELITCHEFF.

REFERENCES CITED

The following references are of record in the file of this patent:

UNITED STATES PATENTS

| Number | Name | Date |
|---|---|---|
| 1,902,169 | Herrmann et al. | Mar. 21, 1933 |
| 1,931,858 | Baur | Oct. 24, 1933 |
| 2,165,962 | Conradi et al. | July 11, 1939 |
| 2,482,725 | Bramwyche et al. | Sept. 20, 1949 |
| 2,487,525 | Copenhaver | Nov. 8, 1949 |
| 2,502,433 | Copenhaver | Apr. 4, 1950 |